Dec. 22, 1953
C. W. WOOD
2,663,231
DUMP WAGON
Filed Nov. 5, 1948
2 Sheets-Sheet 1
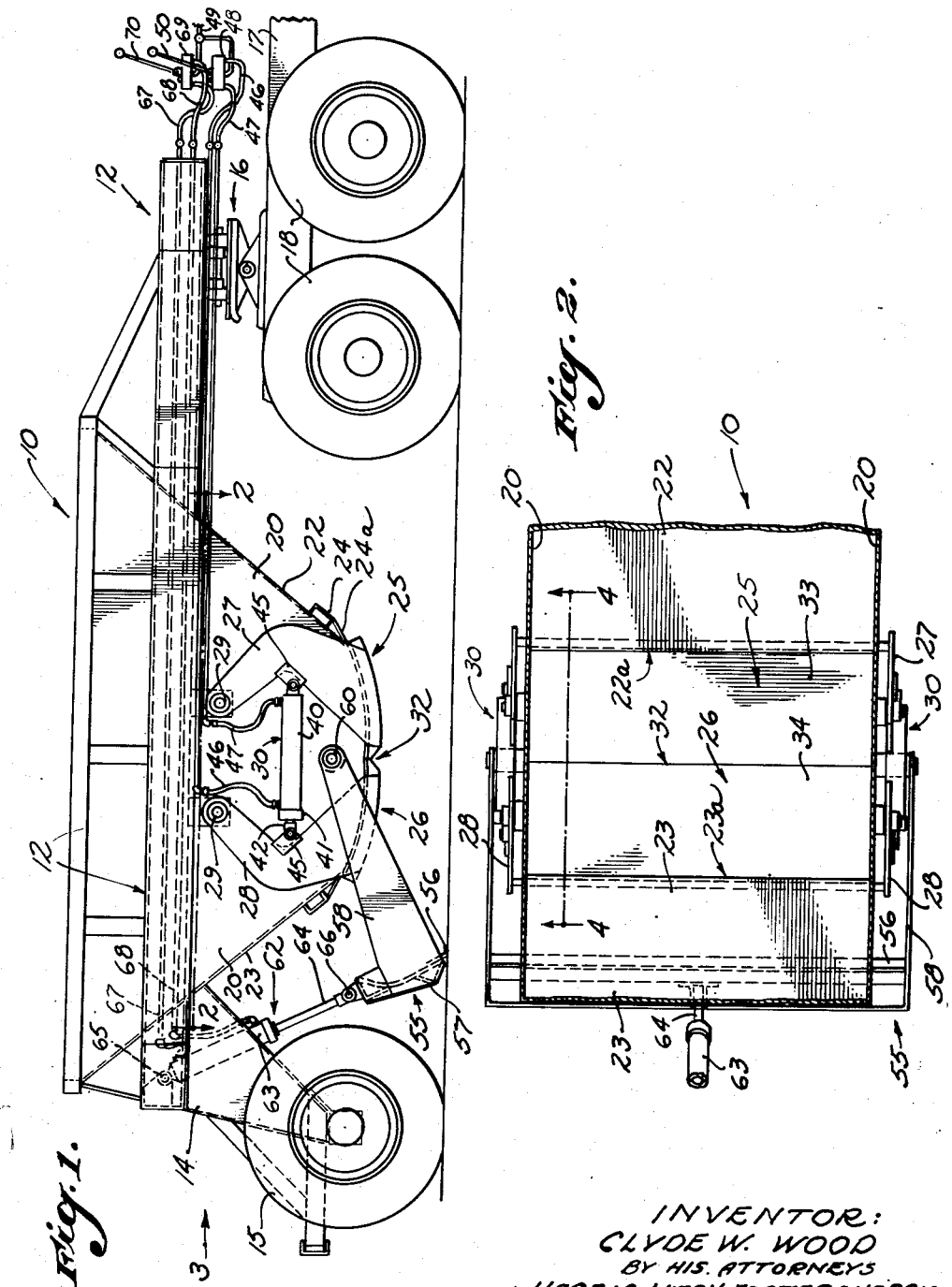
INVENTOR:
CLYDE W. WOOD
BY HIS ATTORNEYS
HARRIS, KIECH, FOSTER & HARRIS Dec. 22, 1953     C. W. WOOD     2,663,231
DUMP WAGON
Filed Nov. 5, 1948     2 Sheets-Sheet 2
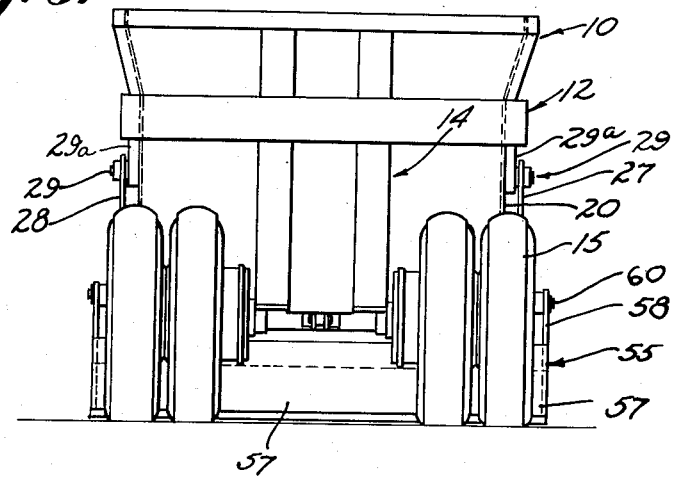
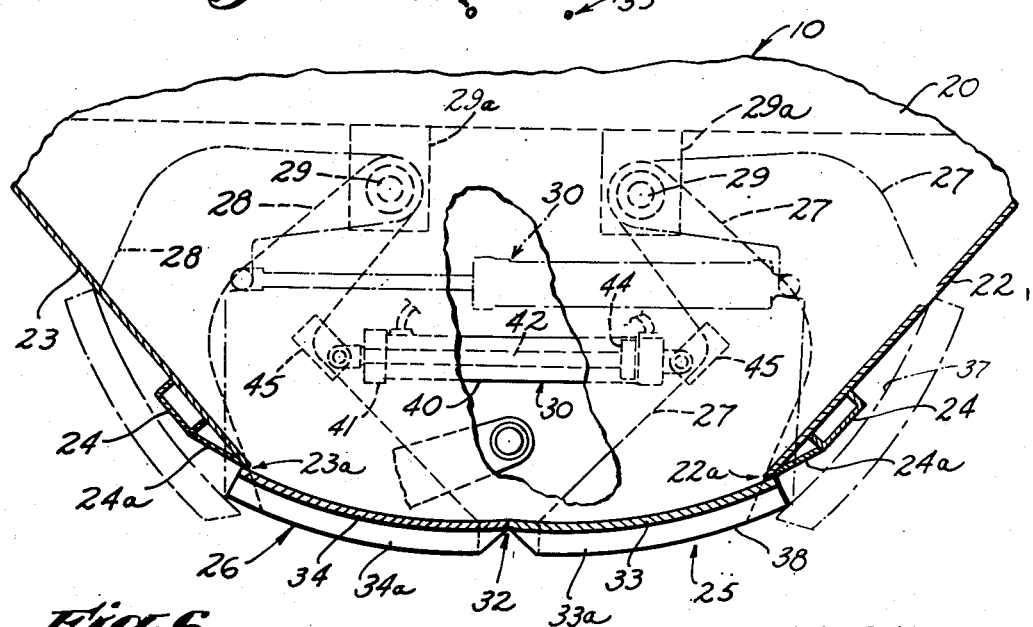
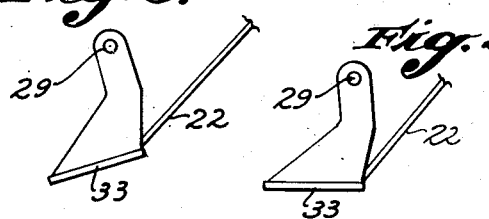
INVENTOR:
CLYDE W. WOOD,
BY HIS ATTORNEYS
HARRIS, KIECH, FOSTER & HARRIS Patented Dec. 22, 1953

2,663,231

UNITED STATES PATENT OFFICE 2,663,231

DUMP WAGON

Clyde W. Wood, Pasadena, Calif.

Application November 5, 1948, Serial No. 58,544

6 Claims. (Cl. 94—44)

This invention relates to dumping equipment, more particularly wheeled vehicles employed for transporting road building materials, and has special application to dump wagons adapted to drop road building materials transversely of the roadway whereby they may be readily spread by spreading devices following on the respective dump wagon itself or on special spreading equipment.

Dump wagons are commonly provided with some form of conventional bottom gate adapted to be opened at the will of an operator for dumping the contents upon a roadway or other location where the materials are to be used. Commonly such gate structures are not thoroughly satisfactory because they do not open and close with sufficient readiness and therefore do not dump the load freely enough. Since such dumping devices normally dump the load longitudinally of the vehicle, subsequent spreading of the load in an even layer is thereby somewhat hindered.

One important object of this invention is to provide in dumping apparatus a load supporting gate which will move away from the adjacent lower edge of the hopper as the gate is swung laterally toward open position so that the gate swings freely and the load is readily released.

It is a further object of the invention so to mount and arrange the gate that the load carrying portion thereof progressively draws away from the lower edge of the hopper whereby further to facilitate gate opening and more readily release the load.

It is also an object of the invention to provide a bottom gate structure which substantially supports the load in a hopper without substantial side thrust upon the gate by reason of the pressure of the load thereon. Another object is to provide a hopper and gate arrangement which will perform such load supporting function and will at the same time permit the gate to be moved progressively away from the lower hopper edge even where the gate is moved out under a sloping bottom of the hopper or sloping side wall of the hopper.

An additional object is to provide in dumping mechanism of the dump wagon type bottom gate mechanism of the indicated nature which may be controlled by fluid operated rams.

Another object is to provide a gate mechanism for dump structures wherein the gates may be used in pairs and operated by fluid type rams either in conjunction or separately. It is also an object to employ such rams as means for controlling the amount of opening of the gates, or a single gate where such is used, so that the load may be distributed along a path of appreciable length.

A still further object is to provide for the disposition of the gate transversely to the line of travel so that the load leaving the hopper may be distributed along a relatively wide path, it being an incidental object to provide scraper or spreader means that may be moved as desired into proper position with respect to a roadway for the even distribution of the dumped material.

Other objects of the invention, and the various features of construction thereof, will become apparent to those skilled in the art upon reference to the following specification and accompanying drawings wherein certain embodiments of the invention are disclosed by way of illustration.

In these drawings:

Fig. 1 is a side elevation of a dump wagon equipped with the improvements of this invention;

Fig. 2 is a fragmentary horizontal section taken approximately from the line 2—2 of Fig. 1;

Fig. 3 is a rear end elevation as indicated by the arrow 3 of Fig. 1;

Fig. 4 is a longitudinal vertical section through the hopper and gate construction of this invention; and Figs. 5 and 6 are diagrammatic illustrations on a small scale of other gate and hopper wall arrangements.

The drawings illustrate a hopper structure 10 carried by a more or less conventional frame 12 having a rear frame portion 14 which supports the rear of the structure upon conventional rear wheels 15. The forward end of the frame 12 is provided with suitable mounting means 16 connecting the frame 12 with the framework 17 of any appropriate tractive implement having ground wheels 18.

The hopper 10 is provided with vertical side walls 20 and with a sloping front end wall 22 and a sloping rear end wall 23 whose lower edges are reinforced as by channel irons 24 and connecting plates 24a (Fig. 4) welded or otherwise appropriately secured thereto.

The front and rear end walls 22 and 23 of the hopper 10 respectively present lower edges 22a and 23a which, in conjunction with the lower portions of the side walls 20, define a bottom opening which is normally closed by a transversely arranged forward swinging gate 25 and an opposed transversely arranged rearward swinging gate 26. Each end of the gate 25 has secured thereto vertically disposed angularly constructed supporting arms 27, and each end of the swinging gate 26 has secured thereto similar supporting arms 28. The arms 27 and 28 are mounted upon the side walls 20 by means of pivots 29 carried in appropriate mounting blocks 29a secured to the side walls 20. The arms 27 and 28 at each side of the hopper 10 are interconnected by hydraulic rams 30 for operation simultaneously of the two gates 25 and 26, as to be explained more fully hereinafter.

Gates 25 and 26, when closed, contact each other along a transverse meeting line 32 which is established by opposing edges of transverse arcuate plates 33 and 34 respectively, these plates constituting the bottom walls for the hopper 10 and serving to support and carry a corresponding proportion of the load of materials with which the hopper is filled. Appropriate reinforcements 33a and 34a are ordinarily employed as illustrated in Fig. 4. According to the preferred construction shown, the edges of the arcuate plates 33 and 34 opposite from the meeting line 32, when closed, slightly underlie the edges 22a and 23a of the hopper end walls, which edges serve as discharge lips when the gates 25 and 26 are fully opened.

When the gates 25 and 26 are closed, their individual transverse median lines are approximately directly below the axes of the respective pivots 29, so that the loads carried by the respective plates 33 and 34 are approximately balanced below such pivotal axes. If the axes of the pivots 29 are positioned slightly inward beyond the mentioned median lines of the plates 33 and 34 when the gates are closed, which relationship is that shown in the drawings, the loads imposed upon the gates 25 and 26 tend generally to keep them in closed position, this being especially true when the disposition of the plates 33 and 34 is substantially horizontal as illustrated. Since it is necessary, according to this invention, that the gates 25 and 26 positively move away from the discharge lips provided by the edges 22a and 23a when the gates are moved from the full line closed position to the broken line open position illustrated in Fig. 4, it is necessary that the plates 33 and 34 be formed on arcs whose radii are somewhat greater than the radii from the centers of the pivots 29 to the nearest edges of the plates 33 and 34, and that the centers for such longer radii be displaced somewhat inward beyond the centers of the pivots 29. Thus, the center of the arcuate plate 33 of the gate 25 is the point 35 indicated in Fig. 4, and the center of the arcuate plate 34 of the gate 26 is indicated at 36. These dispositions are such that the outer edges of the gates may move along the reinforcements 24 and 24a without scraping, the successively following portions of the arcuate plates 33 and 34 progressively drawing away from the reinforcements 24 and 24a and the respective discharge lip. Thus, the outer edge of the plate 33 of the gate 25 moves outward and upward on an arc until the upper face of the plate 33 assumes the broken line position 37 of Fig. 4, and the lowermost portion 38 of the gate 25 moves correspondingly to its indicated broken line position. These relationships are such with respect to the slope of the end walls 22 and 23, which are disposed in the form shown at angles of approximately 50° to the vertical, that the gates may clear the walls 22 and 23 when they are in fully opened position. If the axes of the pivots 29 are shifted slightly outward from the positions illustrated, they will clear somewhat faster, but if moved beyond the median lines of the plates 33 and 34, the resultant load overbalance tends to open the gates 25 and 26. Under such circumstances it is necessary to rely upon the hydraulic rams 30 to keep the gates closed. It will be apparent that substantially horizontal plates 33 and 34 of flat construction cannot be employed and caused to clear the discharge lips provided by the edges 22a and 23a unless the center of the pivot 29 is shifted outward to a position illustrated in Fig. 5 where the load almost entirely is overbalanced. Otherwise it is necessary to dispose the plate 33 or 34 at a very great angle, somewhat as indicated in Fig. 6, thereby defeating the purpose sought specifically.

As previously indicated, the gates 25 and 26 are actuated by hydraulic rams 30 which are connected with the arms 27 and 28 at each side of the hopper 10. These rams 30 are, of course, positioned outside the hopper side walls 20. According to the particular arrangement shown, each ram 30 comprises a cylinder 40 having a head 41 through which projects a piston rod 42 carrying on its inner end a piston 44. At the elbow of each of the angular arms 27 and 28 there is mounted a bracket 45, the outer end of the piston rod 42 being pivotally mounted upon one of such brackets and the opposite end of the cylinder 40 being pivotally mounted upon the other bracket 45. The piston 44 is moved in its cylinder 40 through the medium of hydraulic liquid or other pressure fluid adapted to be passed to opposite sides of the piston by way of pressure lines 46 and 47 which extend to and along the frame 12 and to a valve housing 48 connected with a high pressure fluid line 49 and controlled by a valve shift lever 50. Thus, by appropriate actuation of the lever 50, the piston 44 of each of the hydraulic rams 30 is set at any desired position. This may be such that the gates 25 and 26 are held together in closed relation such as illustrated in Fig. 4, or held wide open as indicated by the broken lines of Fig. 4, or are held partially open for the purpose of distribution of the load in a layer along a path of considerable length.

In order that the contents of the hopper 10, when distributed along a surface such as a roadway, may be fed in a uniform layer, a transversely disposed scraper or spreader 55 is positioned in the rear of the gates 25 and 26. This spreader in the form illustrated comprises a lowermost transverse spreading blade 56 and any appropriate back wall construction such as generally indicated at 57. The spreader 55 is carried at the rear ends of forwardly extending arms 58 which are pivoted at their forward ends upon lower side portions of the side walls 20 of the hopper 10 through the medium of laterally offset pivoting and mounting means 60. The spreader 55 is positioned at any appropriate operating level or at an elevated inoperative level through the medium of a hydraulic ram 62 of construction corresponding with that of the hydraulic rams 30. The ram 62 thus comprises a cylinder 63 from one end of which extends a piston rod 64 having on its inner end a piston (not indicated) corresponding with the piston 44. The upper end of the cylinder 63 is mounted upon the frame 12 by appropriate pivoting means 65 and the lower end of the pivot rod 64 is connected with the upper end of the spreader 55 by appropriate pivoting means 66. Hydraulic lines 67 and 68 extend from the cylinder 63 forward along the frame 12 to a valve housing 69 connected with the high pressure line 49, the valve means in the housing 69 being actuated by an appropriate valve shift lever 70 substantially like the lever 50. These levers 50 and 70 are under the control of an operator of the draft vehicle.

*Operation*

Operation of the mechanism herein disclosed consists largely in operating the hydraulic rams 30 to control the swinging gates 25 and 26 for discharge of the contents of the hopper 10 from an appropriate transverse opening between the inner edges of the bottom plates 33 and 34. In view of the described arrangement of the axes of the pivots 29 by which the supporting arms 27 and 28 of the gates 25 and 26 are swingingly mounted, and in view of the structural configuration of the plates 33 and 34 upon arcs of large radius whose centers are indicated at 35 and 36 and disposed inward from the lines of the centers of the pivots 29, the outward swinging of the gates 25 and 26 causes the bottom plates 33 and 34 to clear the discharge lips provided by the edges 22a and 23a of the end walls 22 and 23 without scraping and with rapid withdrawal of the advancing portions of the gate walls 33 and 34 to the broken line position seen in Fig. 4. In this manner the contents of the hopper 10 are unable to clog and interfere with the opening movement of the gate. This result occurs particularly because, as any material on the respective bottom plates 33 and 34 tends to be drawn into the spaces below the edges 22a and 23a, the corresponding portions of the respective walls 33 and 34 are at once drawn farther away. Thus, the swinging gates are progressively relieved of their load without substantial hindrance. Through the medium of the control lever 50 hydraulic or other high pressure fluid is passed to the rams 30 in such manner as to dispose the inner edges of the gate plates 33 and 34 at any desired position, such as closed position, fully opened position, or intermediate position. The rams will serve as well to hold the gates closed as to hold them open. With the centers of the pivots 29 disposed approximately above the median lines of the arcuate plates 33 and 34, as above described, holding effects required of the hydraulic system are minimized.

When discharged material reaches a road surface, for example, as the apparatus progresses forward, the operator, through the valve control lever 70, causes the hydraulic ram 62 to position the spreader 55 at any desired elevation to accomplish spreading of the discharged material in a layer of any appropriate thickness. For transport purposes the hydraulic ram 62 is actuated to draw the spreader 55 up into an inoperative position.

It is intended to cover all such variations from the preferred structure herein disclosed as fall within the scope of the patent claims.

I claim as my invention:

1. In combination in a dump device: a hopper member having a bottom opening providing edges thereof; swinging gates mounted to move below said opening; arms extending upward at the opposite ends of said gates to mount said gates; pivot means mounting upper ends of said arms on said hopper to dispose one edge of each gate in position at one edge of said opening, said gates being shaped about an arc of longer radius than the radius of said arms and eccentric thereto, whereby portions of the respective gate adjacent to said one edge move progressively farther downward away from said one edge as said gate swings open; and means to move said gates which include fluid-actuating ram means directly connected to intermediate portions of the respective arms at the respective end of said hopper.

2. In combination in dumping mechanism: a hopper member providing side and end walls and having a bottom opening defined by lower edges of said walls; a swinging gate disposed below said opening and adapted to be swung under the lower edge of one of said end walls between a closed position wherein one edge portion of said gate meets said edge of said one end wall to close said bottom opening and an open position wherein the opposite edge of said gate is withdrawn from said opening; pivot means on said end walls above said opening; arm means having upper ends pivoted on said pivot means and having their lower ends connected to the ends of said gate to support and provide for movement of said gate; means to move said gate, said gate providing a bottom wall to close said bottom opening; a longitudinally movable frame carrying said hopper member and said gate transversely thereof; an elongated, substantially straight spreader device carried transversely of said frame at the rear of said transverse gate; and power means to raise and lower said spreader device and distribute dumped materials evenly across a roadway.

3. In combination in dumping mechanism: a hopper member having side walls and end walls providing a bottom opening; a pair of opposed swinging gates having transverse bottom walls adapted to close said opening when brought together, said bottom walls being positioned to swing under the lower edges of said end walls of said hopper; pivot means for each gate carried by said side walls; arm means connected with the ends of each gate and mounted upon said pivot means, the axes of said pivot means being disposed above the respective bottom walls when said gates are closed, and said bottom walls being set in angular relationships with respect to the vertical radii of said axes so that said gates swing clear of said lower edges as said gates are opened, said bottom walls being formed on arcs having greater radii than the radii on which said bottom walls swing, the centers for said greater radii being disposed inward toward each other from the axes of said pivot means; and means to actuate said gates between their open and closed positions and including a single hydraulic ram disposed adjacent each side wall of said hopper member and directly connected to both of the respective arm means of the two gates at intermediate portions of said arm means to operate said gates in unison.

4. In combination in dumping mechanism: a hopper member having side walls and end walls providing a bottom opening; a pair of opposed swinging gates having transverse bottom walls adapted to close said opening when brought together, said bottom walls being positioned to swing under the lower edges of said end walls of said hopper; pivot means for each gate carried by said side walls; arm means connected with the ends of each gate and mounted upon said pivot means, the axes of said pivot means being disposed above the respective bottom walls when said gates are closed, and said bottom walls being set in angular relationships with respect to the vertical radii of said axes so that said gates swing clear of said lower edges as said gates are opened; and a single hydraulic ram disposed adjacent each side wall of said hopper member between the arm means of the two gates and connected at its opposite ends to intermediate portions of both the respective arm means of the two gates to operate said gates in unison, both of said respective arm means being offset to provide space to accommodate said ram.

5. A combination as in claim 3 wherein each arm means of each gate includes a bent arm providing an elbow which is directed away from the elbow of the bent arm of the opposite gate, and the respective hydraulic ram is disposed in the space between such opposed elbows of said arms, the opposite ends of such ram being connected with said arms at said elbows.

6. A combination as in claim 4 wherein each arm means of each gate includes a bent arm having its bend directed away from the bend of the bent arm of the opposite gate, the respective ram being disposed in the space between the resultant opposing bends of said arms and connected to the arms at said bends.

CLYDE W. WOOD.

References Cited in the file of this patent

UNITED STATES PATENTS

| Number | Name | Date |
|---|---|---|
| 699,820 | Sage | May 13, 1902 |
| 855,128 | Peltzer | May 28, 1907 |
| 873,187 | Taylor et al. | Dec. 10, 1907 |
| 1,087,343 | Abbott | Feb. 17, 1914 |
| 1,159,640 | Benson | Nov. 9, 1915 |
| 2,140,421 | Fageol | Dec. 13, 1938 |
| 2,156,601 | Mosling et al. | May 2, 1939 |
| 2,237,299 | Benbow et al. | Apr. 8, 1941 |
| 2,268,290 | Landis | Dec. 30, 1941 |
| 2,401,407 | Benbow et al. | June 4, 1946 |
| 2,479,800 | Williams | Aug. 23, 1949 |
| 2,494,472 | De Saussure | Jan. 10, 1950 |
| 2,539,731 | Dixson | Jan. 30, 1951 |